Dec. 25, 1956　　　　E. A. MEEWES　　　　2,775,466
TANDEM AXLE BOGIE FOR AUTOMOTIVE VEHICLES
Filed Aug. 13, 1953　　　　　　　　　　　　4 Sheets-Sheet 1

INVENTOR
Edward A. Meewes,

BY
ATTORNEY

Dec. 25, 1956    E. A. MEEWES    2,775,466
TANDEM AXLE BOGIE FOR AUTOMOTIVE VEHICLES
Filed Aug. 13, 1953    4 Sheets-Sheet 2
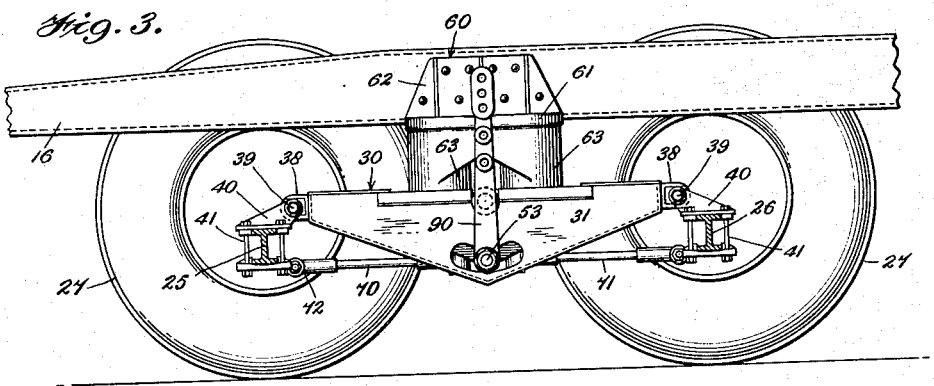
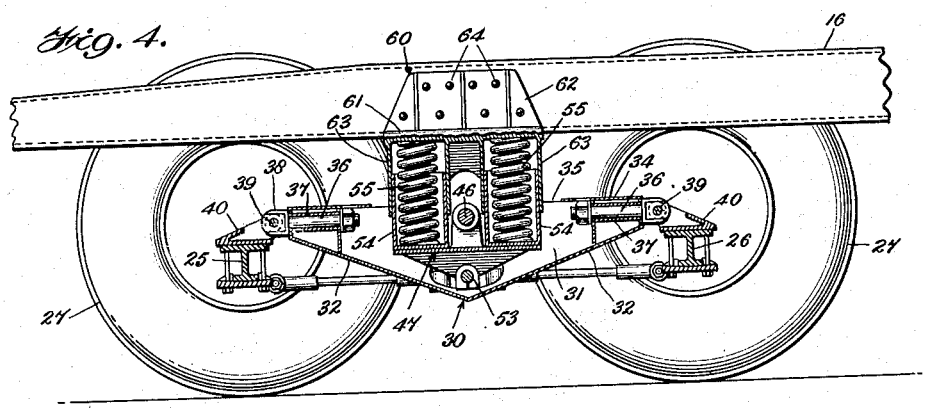
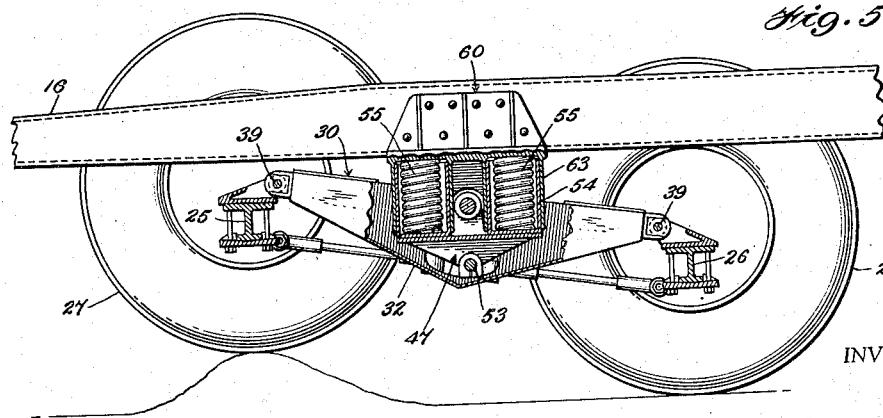
INVENTOR
Edward A. Meewes,
BY
ATTORNEY Dec. 25, 1956  E. A. MEEWES  2,775,466
TANDEM AXLE BOGIE FOR AUTOMOTIVE VEHICLES
Filed Aug. 13, 1953  4 Sheets-Sheet 3

INVENTOR
Edward A. Meewes,
BY
ATTORNEY

Dec. 25, 1956   E. A. MEEWES   2,775,466
TANDEM AXLE BOGIE FOR AUTOMOTIVE VEHICLES
Filed Aug. 13, 1953   4 Sheets-Sheet 4

INVENTOR
Edward A. Meewes,

BY
ATTORNEY

United States Patent Office 2,775,466
Patented Dec. 25, 1956

2,775,466

TANDEM AXLE BOGIE FOR AUTOMOTIVE VEHICLES

Edward A. Meewes, Greenfield, Wis., assignor to Chain Belt Company, Milwaukee, Wis., a corporation of Wisconsin Application August 13, 1953, Serial No. 374,010

13 Claims. (Cl. 280—104.5)

This invention relates to tandem axle bogies or trucks for automotive vehicles and has for its principal object the provision of an improved apparatus of this character which may either be incorporated into new vehicles as standard equipment or supplied as a readily substituted replacement for the conventional front and/or rear axle constructions already in use.

Tandex axle arrangements have been long employed at the rear end of busses and motor trucks, and while some attempts have been made to provide similar constructions at the front ends thereof, these suggestions thus far have failed to attain any substantial acceptance by truck manufacturers or by the industries employing such vehicles. However, in view of the continuing increase in the size and weight of motor trucks, and of the loads carried thereby, it becomes more and more desirable to devise an acceptable front end tandem axle construction, especially since many States now impose limits on the loads carried by each axle of a vehicle in an effort to prevent overrapid deterioration of their highways due to excessive loads.

For the most part the previous tandem axle devices have employed leaf springs, although in recognition of certain advantages accruing from the use of coil springs, a few constructions have embodied the latter. However, the coil spring arrangements thus far proposed have not proved entirely satisfactory in practice, and it is a further object of the present invention to provide a tandem axle truck or bogie employing helical springs or their equivalent, so constructed and arranged as to overcome at least some of the objections that have been noted to prior constructions of this type.

In a more limited aspect, it is a further object of the invention to provide an improved spring mounting for a motor vehicle bogie whereby, without changing the normal position of the vehicle frame in relation to the ground as found in conventional axle constructions, and without raising the center of gravity of the vehicle, the coil springs may be disposed directly beneath the longitudinal chassis members, to the end that twisting moments such as are imposed on said members when the springs are located to one side of the members, are avoided.

A still further object of the invention is to provide improved means for maintaining substantial parallelism of the vertical axes of the axles of the bogie under all conditions, and particularly when one or both ends of an axle rise or fall as the wheels thereof pass over elevations or depressions in the roadway or surface over which the vehicle is traveling.

As above indicated, the present apparatus may constitute the original running gear of a motor truck, or it may be furnished as a conversion unit to be substituted for the conventional front and/or rear axle constructions of trucks already in use. When so substituted the change may be made without any alterations in the truck frame other than the drilling of a few holes in the longitudinal channel members thereof to receive bolts or rivets for attachment of two brackets per unit; and when a unit is substituted for the conventional single front axle of a vehicle, the forward axle of the conversion unit may and preferably does occupy the same position beneath the frame as did the said conventional axle. This in effect reduces the wheel-base of the vehicle, since in tandem axle constructions the wheel-base is figured from the medial vertical plane between the axles.

For purposes of disclosure a steerable unit of the stub axle type for use at the front end of an automotive vehicle and embodying the improved constructions and arrangements of this invention, has been illustrated in the accompanying drawings, although by substituting live axles for the dead axles, and omitting the elements necessary for effecting steering, the structure would be equally well adapted for use at the rear end of the vehicle.

In the said drawings, in which like reference characters designate like parts in all the views:

Fig. 3 is a sectional-elevational view of the unit, taken on the plane indicated by the line 3—3 in Fig. 2 and looking in the direction of the arrows, the parts being shown in their normal positions, i. e., those occupied when the vehicle is on a level surface;

Fig. 4 is a view similar to Fig. 3 but taken on the plane indicated by the line 4—4 in Fig. 2, looking in the direction of the arrows;

Fig. 5 is a view similar to Fig. 4, but showing the positions momentarily assumed by the several parts when the forward wheels of the unit strike an elevation in the roadway, resulting in compression of the coil springs;

Figure 1:
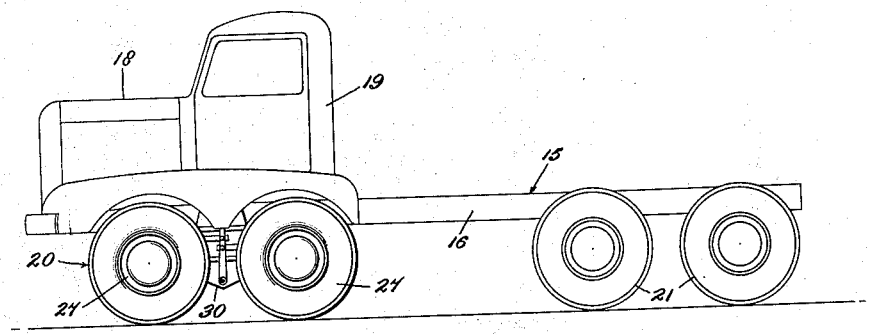
Figure 1 is a side elevational view of a conventional heavy duty motor truck, the front end of which is shown as equipped with a tandem axle unit constructed and arranged in accordance with the present invention.
Figure 2:
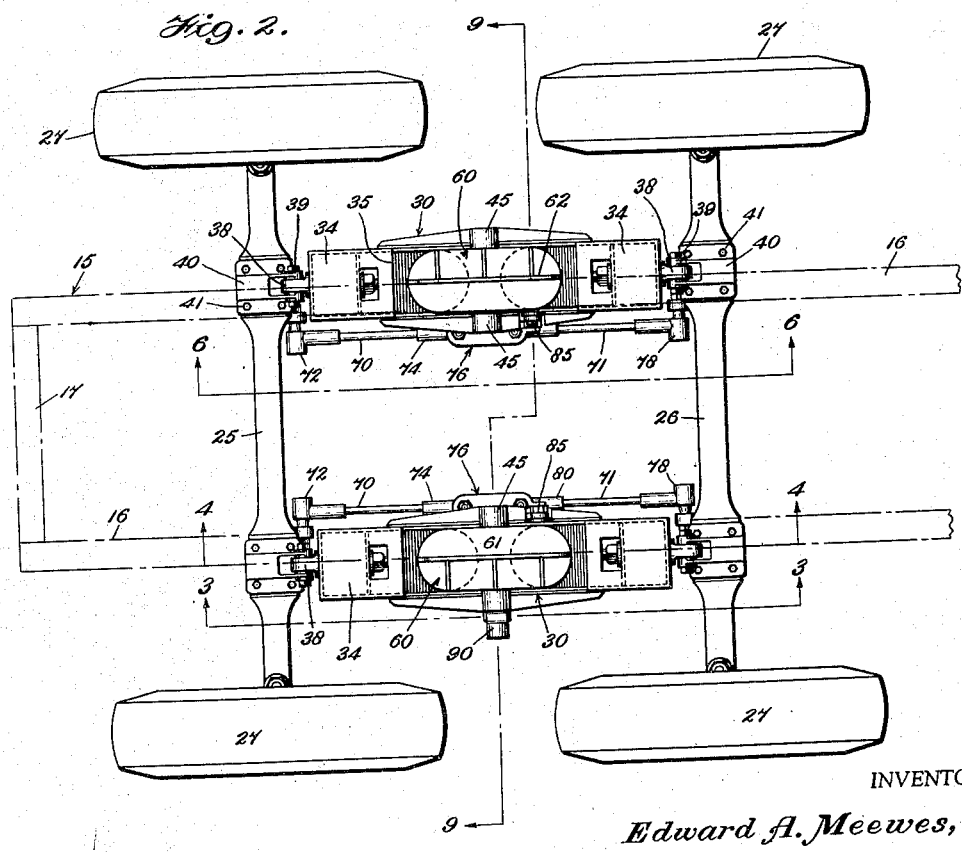
Fig. 2 is an enlarged plan view of said unit, with the vehicle frame channels being indicated in broken lines.

Referring to the said drawings in greater detail, the conventional motor truck shown in Fig. 1 has the usual body frame 15 comprising a pair of longitudinal channel members 16 maintained in transversely spaced relation by appropriate cross members, one of which is indicated at 17 in Fig. 2. The motor for propelling the vehicle is usually mounted on the forward end of this frame beneath a hood 18, behind which is located the driver's compartment or cab 19. In Fig. 1 the forward end of the frame 15 is shown as mounted upon one of the present tandem axle units 20, while the rear end is supported by a conventional tandem axle construction 21, although as previously indicated one of the present units equipped with live axles might be employed at the rear end if desired.

As best shown in the remaining figures of the drawings, the present bogie or truck comprises a pair of transversely extending axles 25 and 26 disposed in longitudinally spaced relation, which axles may be and usually are of conventional I-beam construction and are equipped at each of their ends with rubber tired wheels 27 carried by conventional stub axle devices for steering purposes. Since the particular steering mechanism constitutes no part of the present invention, it has not been illustrated.

Figure 8:
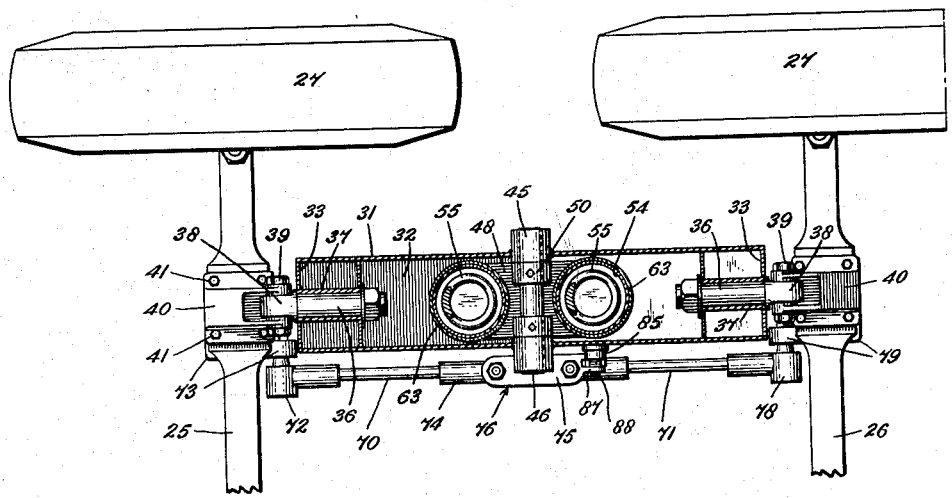
Fig. 8 is a horizontal sectional-plan view, taken approximately on the plane indicated by the line 8—8 in Fig. 6, looking down.
Figure 9:
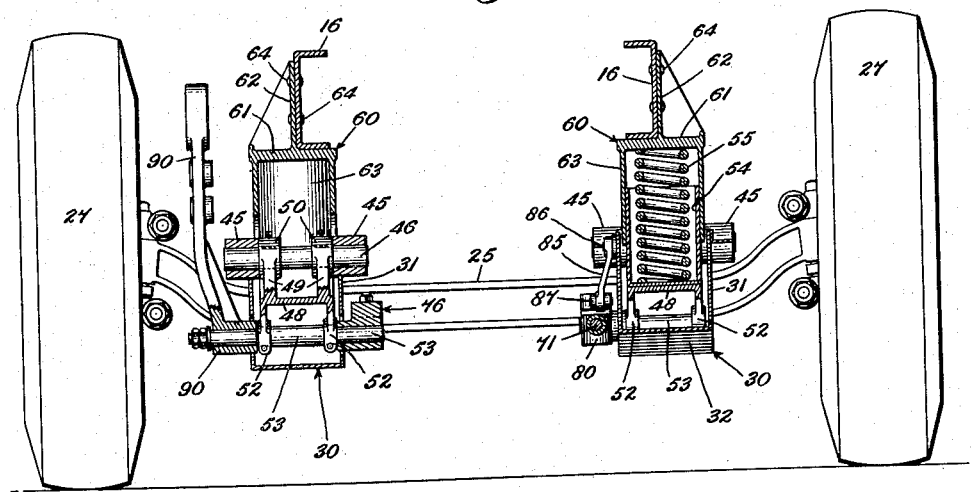
Fig. 9 is a cross sectional view of the unit, on approximately the planes indicated by the line 9—9 in Fig. 2, looking in the direction of the arrows.

Disposed between the axles 25 and 26 is a pair of transversely spaced longitudinal beam structures 30, of a hollow construction of U-shape in cross section and generally simulating a box girder. That is to say, as best shown in Figs. 4 and 8, each beam comprises a pair of spaced side walls 31 of substantially triangular shape in elevation, which are rigidly connected by bottom walls 32, end walls 33 and partial top walls 34, one at each end leaving an open space 35 between them. Each end of each beam 30 is universally pivotally connected to the axle adjacent such end by means of a longitudinal pin 36 rotatably mounted in a bearing 37 rigidly carried by the beam structure, the projecting heads 38 of such pins, located beyond the ends of the beam, being transversely pivotally connected by pins 39 to brackets 40 that are mounted on the tops of the axles 25 and 26 and secured in place by bolts 41.

Figure 10:
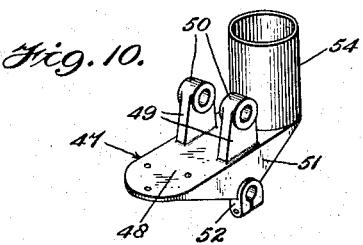
Fig. 10 is a perspective view of one of the pendent spring supporting elements employed in the unit.

The respective side plates 31 of each beam structure 30 carry transversely alined bearings 45 in which is journaled a pin 46 the intermediate portion of which carries a pendent spring-supporting element 47. As best shown in Fig. 10, this element comprises an elongated horizontal platform 48 constituting a spring seat member, from the medial portion of which a pair of spaced arms 49 extend upwardly, terminating in apertured bosses 50 which receive the pin 46 (see Figs. 3, 4, 5, 8 and 9). From each lateral edge of the platform 48 there depends a triangular web 51, which webs terminate at their lower apexes in apertured split ears 52 which receive and are clamped to a transverse pin 53 to which the torque resisting elements mentioned above are connected, as will appear more fully below. An open-topped hollow cylindrical spring housing 54 is rigidly secured to each end portion of the platform 48 and a helical compression spring 55 is disposed within each such housing, as will be clear from Figs. 4, 5 and 8. These springs are of such length as to project beyond the upper ends of the housings when uncompressed.

A bracket member 60 is rigidly secured to each of the longitudinal channel members 16 of the vehicle frame, each such bracket comprising a horizontal plate 61 provided with an upstanding longitudinal flange 62 and a pair of open-bottomed hollow cylindrical spring housing members 63 depending from the plate. Attachment of the brackets to the frame channels is by means of rivets or bolts 64 passing through the vertical webs of said channels and the upstanding flanges 62 of the brackets. The horizontal plates 61 underlie the lower flanges of the frame channels 16 (see Fig. 9), with the axes of the cylindrical spring housings 63 in substantial vertical alinement with the vertical webs of said frame channels; and the said housings telescopically fit the upstanding housings 54 of the spring-supporting element 47 from above, with the under surface of the plate 61 resting on the tops of the springs 55 and partially compressing them.

Several advantages result from employment of the pendent spring-supporting elements 47, among them being that since the center of gravity of the elements is below their axis of suspension, there is no inherent tendency for the elements to rotate about such axes. The elements are practically completely housed within and protected by the beam structures 30, and the springs 55 are positioned low enough that, as just mentioned, the telescoping cylinders 63 of the brackets 60 may be disposed directly below and in substantial alinement with the vertical webs of the frame channels 16, thereby substantially eliminating twisting strains on said channels. The said frame members also may be maintained at the usual height above the ground found in conventional axle constructions and thus the center of gravity of the vehicle is not raised above normal.

As is customary in these tandem axle constructions, parallelism of the vertical axes of the axles 25 and 26 is maintained by a system of torque rods. As best shown in Figs. 6, 7, 8 and 9, each beam structure 30 has associated with it a pair of such rods 70 and 71, the former of which has its forward end connected by a ball joint device 72 to a plate 73 that is rigidly secured against the under face of the forward axle 25 by the bolts 41. The rearward end of said rod 70 is connected by a ball joint device 74 to one end of the horizontal member 75 of a T-shaped bracket 76, the vertical leg 77 of which is journaled on one end of the pin 53 that is carried by the ears 52 of the spring-supporting element 47. In a similar manner, the torque rod 71 has its rearward end connected by a ball joint device 78 to a plate 79 rigidly carried by the rearward axle 26, while the forward end of such rod is connected by a ball joint device 80 to the other end portion of the cross-bar 75 of the bracket 76. The parts are so proportioned and arranged that the torque rods 70 and 71 are in axial alinement.

Figure 6:
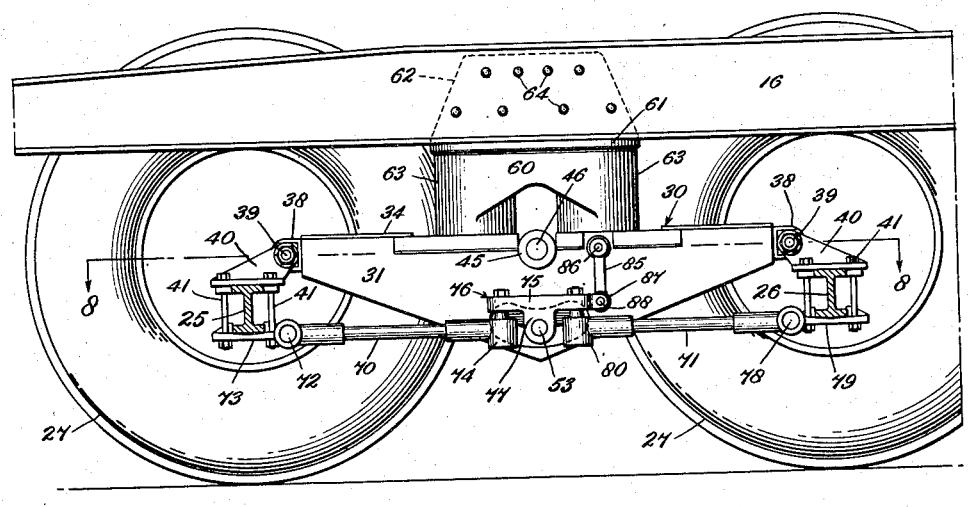
Fig. 6 is a sectional-elevational view, on a slightly larger scale, taken on the plane indicated by the line 6—6 in Fig. 2, looking in the direction of the arrows and showing the normal positions of the torque resisting elements which maintain the parallelism of the vertical axes of the axles.
Figure 7:
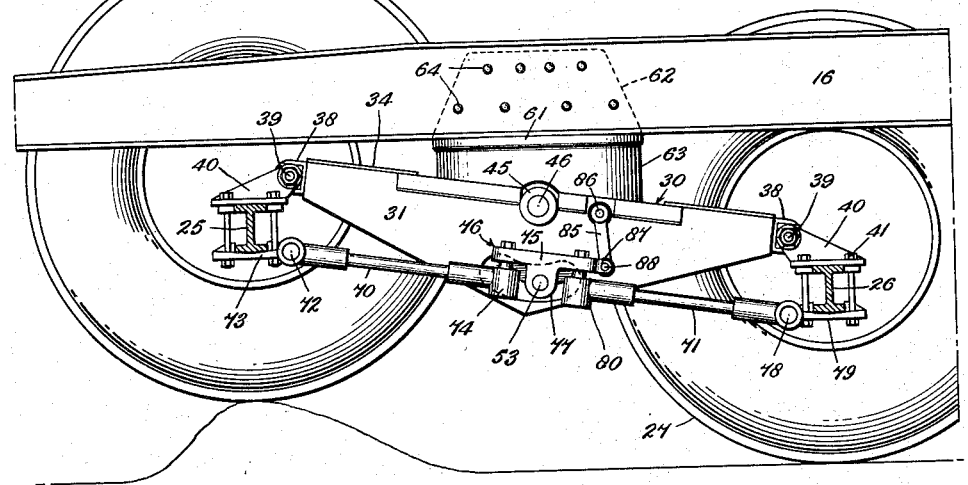
Fig. 7 is a view similar to Fig. 6, illustrating the positions assumed by the torque resisting elements when the forward wheels are elevated as in Fig. 5.

When the bogie is on level ground as depicted in Fig. 6, the axes of the several pins 36, 39 and 46 associated with each beam are in the same horizontal plane, and since the vertical distance between the axes of the pins 39 and the respective ball joint devices 72 and 78 is made equal to that between the axes of the pins 46 and 53, the longitudinal axis of the torque rods 70 and 71 is parallel to the above mentioned horizontal plane. When one of the forward wheels 27 encounters an elevation in the roadway, whereby it is raised as shown at the left of Figs. 5 and 7, the end portion of the axle 25 which carries such wheel is also raised and since the rearward wheels are still on level ground, the beam structure 30 and the torque rod system associated with such elevated wheel are inclined substantially as shown in the figures. The swinging movement of the beam takes place about the axis of the pin 39 carried by the rearward axle 26, while the movement of the torque rods takes place about the axis of the ball joint device 78 associated with such axle, and since the axes of the respective pins 39 and those of the ball joint devices 72 and 78 are located at the four corners of a parallelogrammatic figure, during these swinging movements the torque rods 70 and 71 will maintain substantial verticality of the vertical axis of the axle 25 and its parallelism with the corresponding axis of the axle 26.

If both forward wheels 27 encounter an elevation simultaneously the axle 25 will be raised without any transverse inclination thereof and both beams 30 will be inclined as shown in Figs. 5 and 7. If only one wheel is raised while the others remain on level ground, the axle will be inclined transversely but the longitudinal pins 36 permit this without twisting movements being imparted to the beam. If the wheels encounter a depression instead of an elevation, the same actions take place except that the beams 30 are inclined in the opposite direction; and of course, similar actions occur when the rearward wheels pass over elevations or into depressions.

Since the pins 46 are midway between the ends of their beams 30, when a wheel rises as in Fig. 5, inclination of its beam produces an upward movement of the pin 46 thereof, the amplitude of which is one-half of that of the axle 25 and as the spring seat element 47 is carried by such pin, said element is moved upwardly a like distance. This momentarily compresses the springs 55 between the seat member 48 and the plate 61 without substantial raising of the vehicle frame channel 16, but of course the springs react and the frame channel ultimately will be elevated. In similar manner, when a wheel drops into a depression the springs momentarily expand from the normal condition shown in Fig. 4 and then react to permit a lowering of the frame channel but within the limits of their compressibility and expansion the springs absorb road shocks and render changes in elevation of the frame channels less violent.

Since the bracket 60 is rigidly secured to the frame channel 16 with the axes of its cylindrical spring housings 63 normally vertical, the upward and downward movements of the spring-supporting element 47 must also be vertical, as its spring housings 54 telescope with and are guided by the bracket housings. Verticality of the movements of the said element 47 insures that the axes of the axles 25 and 26 are maintained in vertical planes since the inward ends of the torque rods 70 and 71 are connected through the T-shaped bracket 76 to the pin 53 carried by the said spring-supporting element.

The ball joint devices 72, 74, 78 and 80 are provided in order that the torque rods may function properly not only when both ends of an axle rise or fall simultaneously but also when one end moves, producing transverse inclination of such axle. However, the fact that the inward ends of the torque rods are not rigidly connected to the T-shaped bracket 76 permits the rods to exert a cranking effect upon such bracket whenever a wheel encounters an elevation or depression, which would impair the effectiveness of the rods in maintaining verticality of the axle axes. To prevent this a link 85 is provided on each beam structure 30, the upper end of each such link being journaled on a stud 86 rigidly carried by and projecting from the inner side plate 31 of the beam, while the lower end of said link is disposed between a pair of ears 87 extending rearwardly from the bracket 76, to which ears the link is pivotally connected by a pin 88. As will be understood from Figs. 6 and 7, these links 85 act to maintain axial alinement of the torque rods 70 and 71 at all times.

It will be noted from the drawings that the connections 39 between the axle brackets 40 and the end portions 38 of the beam-carried pins 36 are disposed inwardly of the vertical axes of the respective axles 25 and 26 and above the horizontal axes of such axles. As a result, a moment of force is imposed upon each axle by the weight on the beams, such moments tending to rotate the axle 25 in a clockwise direction and the axle 26 in a counterclockwise direction, as viewed in Figs. 3 to 7 inclusive. Consequently, the torque rods 70 and 71 have residual tension stresses imposed upon them which, in the case of the forward torque rods 70, increase their resistance to road shocks because such shocks tend to create a counterclockwise moment of force on the axles which put the rods 70 under compression. If such rods are already under tension they must pass through tension to compression and thus have greater resistance thereto. While the tension forces on the rear torque rods 71 are cumulative, the alined rods 70 and 71, serving as a column, are much more capable of resisting tension stresses and therefore the arrangement provides increased over-all resistance to road shocks.

The pin 53 of the spring-supporting element 47 disposed in the left-hand beam 30 (as viewed in Fig. 9), not only journals a torque rod bracket 76 on its right-hand end but also carries an upwardly extending arm 90 on its other end. In practice this arm is connected by appropriate drag links and cross tie bars to the steering arms of the several wheels, and to the gear or other mechanism whereby motion is transmitted from the steering wheel in the cab 19 of the vehicle. However, as previously indicated, the steering mechanism constitutes no part of the present invention.

What is claimed is:

1. In a tandem axle bogie for disposition beneath and attachment to the longitudinal frame members of a motor vehicle, the combination of a pair of longitudinally spaced transverse parallel axles; a pair of transversely spaced longitudinal beams disposed between said axles, each such beam having its respective ends universally pivotally connected to the axle adjacent thereto; spring-supporting means pendently carried by each of said beams intermediate the ends thereof; spring means mounted on said pendent supporting means and extending upwardly thereof; means attachable to said vehicle frame members in depending relation thereto for engagement with the upper portions of said spring means; and connections between said axles and said pendent spring-supporting means for maintaining verticality of the vertical axes of the axles and spring-supporting means.

2. In a tandem axle bogie for disposition beneath and attachment to the longitudinal frame members of a motor vehicle, the combination of a pair of longitudinally spaced transverse parallel axles; a pair of transversely spaced longitudinal beams disposed between said axles, each such beam having its respective ends universally pivotally connected to the axle adjacent thereto; a spring-supporting element journaled on each of said beams intermediate the ends thereof, each such element including a horizontal member disposed below the plane of the journal axis and provided with upwardly extending spring housings; spring means mounted in said housings; members telescopically fitting said housing from above and resting on the spring means therein, such members being rigidly attachable to the respective longitudinal frame members of the vehicle in wholly depending relation thereto; and connections between each of said spring-supporting elements and each axle for maintaining substantial parallelism of the vertical axes of said elements and axles.

3. A tandem axle bogie for disposition beneath and attachment to the longitudinal frame members of a motor vehicle, comprising a pair of transversely extending axles disposed in longitudinally spaced parallel relation; a pair of hollow transversely spaced longitudinal beams extending between said axles, each such beam having its respective ends universally pivotally connected to the axle adjacent thereto; a spring-supporting element disposed within the midportion of each of said hollow beams and pendently journaled therein, each such element including a horizontal spring seat member disposed below the plane of its journal axis and being provided with vertical open-topped spring housings; spring means disposed within said housings and projecting thereabove; additional housing members telescopically fitting the first named housings from above and resting upon the spring means therein, the second named housings being rigidly attachable to the respective longitudinal frame members of the vehicle in wholly depending vertically alined relation thereto; and torque resisting connections between each of the pendent spring-supporting elements and each of said axles.

4. A tandem axle bogie for disposition beneath and attachment to the longitudinal frame members of a motor vehicle, comprising a pair of transversely extending axles disposed in longitudinally spaced parallel relation; a pair of hollow transversely spaced longitudinal beams disposed between said axles, each such beam having its respective ends universally pivotally connected to the axle adjacent thereto; a spring supporting element disposed within the midportion of each of said hollow beams, each such element comprising a horizontal longitudinally extending platform having arms extending upwardly from the medial portion thereof and pivotally connected to the beam at their upper ends, said platform also carrying a vertical spring housing at each side of said arms; coil springs disposed in said housings and projecting above the upper ends thereof; additional housing members telescopically fitting the first named housings from above and having portions resting upon said springs, the second named housings being rigidly attachable to the respective longitudinal frame members of the vehicle in depending substantially vertical alinement therewith; and connections between each of said spring-supporting elements and each axle for maintaining substantial verticality and parallelism of the verticle axes of said elements and axles.

5. In a motor vehicle having a frame including transversely spaced longitudinal members, the combination of a pair of transverse longitudinally spaced parallel axles disposed beneath said frame members; a pair of hollow transversely spaced longitudinal beams extending between said axles, each such beam having its respective ends universally pivotally connected to the axle adjacent thereto; a spring-supporting element disposed within the midportion of each of said hollow beams and having transverse pivotal connections therewith, each such element including a horizontal spring seat member disposed in a plane lower than that of the axis of said pivotal connections; vertical spring housings carried by said seat members; coil springs mounted in said housings and extending above the upper ends thereof; additional spring housings rigidly secured to and depending from the respective longitudinal vehicle frame members in substantial vertical alinement therewith, said additional housings telescopically fitting the first named spring housings from above and engaging the upper ends of said springs; and connections between each of said spring-supporting elements and each axle for maintaining substantial parallelism of the vertical axes of said elements and axles.

6. In a tandem axle bogie for disposition beneath and attachment to the longitudinal frame members of a motor vehicle, the combination of a pair of longitudinally spaced transverse parallel axles; a pair of hollow transversely spaced longitudinal beams disposed between said axles, each such beam having its respective ends universally pivotally connected to the upper portion of the axle adjacent thereto; a spring-supporting element disposed within the midportion of each of said hollow beams, such elements being transversely pivotally connected to their beams in substantially the horizontal plane of said universal connections between the beam ends and the axles, said elements each comprising a horizontal spring seat member disposed below said horizontal plane, and vertical spring housings carried by said member; spring means mounted in said housings; additional spring housings rigidly attachable to said vehicle frame members in depending vertically alined relation thereto, such additional housings telescopically fitting the first named housings and engaging the upper ends of the spring means therein; and connections between each of said spring-supporting elements and each axle for maintaining substantial parallelism of the vertical axes of the several elements and axles.

7. In a tandem axle bogie for disposition beneath and attachment to the longitudinal frame members of a motor vehicle, the combination of a pair of longitudinally spaced transversely disposed parallel axles; a pair of transversely spaced longitudinal hollow beams extending between said axles, each such beam having its respective ends both longitudinally and transversely pivotally connected to the upper portion of the axle adjacent thereto; a spring-supporting element disposed within the mid portion of each of said hollow beams, each such element being transversely pivotally connected to its beam in substantially the horizontal plane of the pivotal connections between the ends of the beam and the axles, said elements each comprising a horizontal spring seat member disposed below said horizontal plane, and vertical spring housings carried by said member; spring means mounted in said housings; means telescopically fitting said housings from above and engaging the upper ends of the spring means therein, such telescopic means being rigidly attachable to the longitudinal vehicle frame members in wholly depending relation thereto; and torque rods connected to the lower portions of each of said spring-supporting elements and each of said axles, such rods being disposed in parallel relation to said horizontal plane of the pivotal connections of the beams.

8. In a tandem axle bogie for disposition beneath and attachment to the longitudinal frame members of a motor vehicle, the combination of longitudinally disposed transversely disposed parallel axles; a pair of transversely spaced longitudinal beams extending between said axles and having their respective ends universally pivotally connected to the upper portion of the axle adjacent thereto; a pendent spring-supporting element transversely pivotally carried by each beam at the mid portion thereof; vertically extending springs carried by said elements; means attachable to said vehicle frame members in depending relation thereto for engagement with the upper portions of said springs; a bracket member pivotally attached to the lower portion of each spring-supporting element; torque rods extending between said brackets and each of said axles, the ends of such rods being universally pivotally connected respectively to the brackets and to the lower portions of the axles; and connections between the brackets and their respective beams for preventing cranking action on the brackets by the torque rods.

9. In a tandem axle bogie for disposition beneath and attachment to the longitudinal frame members of a motor vehicle, the combination of a pair of longitudinally spaced transversely disposed parallel axles; a pair of transversely spaced longitudinal beams extending between said axles and having their respective ends universally pivotally connected to the upper portion of the axle adjacent thereto; a pendent spring-supporting element transversely pivotally carried by each beam at the mid portion thereof; vertically extending springs carried by said elements; means attachable to said vehicle frame members in depending relation thereto for engagement with the upper portions of said springs; a T-shaped bracket disposed adjacent each of said beams and having its vertical leg pivotally attached to the lower portion of the spring-supporting element carried by such beam; axially alined torque rods extending from each bracket to the respective axles, such rods having their ends universally pivotally connected respectively to the lower portion of an axle and to an end of the cross-bar of a bracket; and connections between said brackets and their respective beams for maintaining the axial alinement of their torque rods.

10. In a tandem axle bogie for disposition beneath and attachment to the longitudinal frame members of a motor vehicle, the combination of a pair of longitudinally spaced transversely disposed parallel axles; a pair of transversely spaced longitudinal beams extending between said axles and having their respective ends universally pivotally connected to the upper portion of the axle adjacent thereto; a pendent spring-supporting element transversely pivotally carried by each of said beams at the mid portion thereof; vertically extending springs carried by said elements; means attachable to said vehicle frame members in depending relation thereto for engagement with the upper portions of said springs; a T-shaped bracket disposed adjacent each of said beams and having its vertical leg pivotally attached to the lower portion of the spring-supporting elements carried by such beam; axially alined torque rods extending from each bracket to each axle, such rods having their ends universally pivotally connected respectively to the lower portion of an axle and to an end of the cross-bar of a bracket; and a link pivotally connected to each bracket and to its adjacent beam, for maintaining the axial alinement of their torque rods.

11. A sub-assembly for motor vehicle body-frame suspension mechanism, comprising a unitary rigid elongated hollow beam structure, and a pendent spring-supporting element transversely pivotally carried by said beam structure within the mid portion thereof for unrestrained oscillation of the one relative to the other, said element including a horizontal platform adapted to support spring elements superposed thereon, such platform being disposed below the plane of the pivotal connections between the element and beam and completely housed within the latter.

12. A sub-assembly for motor vehicle body frame suspension mechanism, comprising an elongated rigid beam structure of substantially U-shape in cross section, and a spring-supporting element transversely pendently mounted by the side walls of the U-shaped beam structure within the mid portion of the latter, said element including a horizontal spring seat platform disposed below the plane of the pendent connections between the element and beam and completely housed within the beam, said platform having coil spring housings extending upwardly therefrom and at least partially enclosed by the beam structure.

13. A tandem axle bogie for disposition beneath and attachment to the longitudinal frame members of a motor vehicle, comprising a pair of transversely extending axles disposed in longitudinally spaced parallel relation; a pair of transversely spaced longitudinal beams disposed between said axles, each such beam having its respective ends universally pivotally connected to the axle adjacent thereto at locations inwardly of the vertical axes of such axles and above their horizontal axes; spring means carried by said beams for supporting the vehicle frame members; and torque-resisting members connecting the mid portions of said beams with said axles at locations below the horizontal axes of the latter, whereby the weight imposed on the beams creates residual tension stresses in said torque-resisting members to increase their resistance to road shocks.

References Cited in the file of this patent

UNITED STATES PATENTS

| | | |
|---|---|---|
| 1,920,055 | Bluhm | July 25, 1933 |
| 2,092,046 | Bixler | Sept. 7, 1937 |
| 2,172,173 | Peterman | Sept. 5, 1939 |
| 2,251,360 | Knox | Aug. 5, 1941 |